(12) United States Patent
Que

(10) Patent No.: US 12,234,937 B2
(45) Date of Patent: Feb. 25, 2025

(54) QUICK CONNECTOR

(71) Applicant: A. RAYMOND ET CIE, Grenoble (FR)

(72) Inventor: Feng Que, Jiangsu (CN)

(73) Assignee: A. RAYMOND ET CIE, Grenoble (FR)

( * ) Notice: Subject to any disclaimer, the term of this patent is extended or adjusted under 35 U.S.C. 154(b) by 25 days.

(21) Appl. No.: 18/125,450

(22) Filed: Mar. 23, 2023

(65) Prior Publication Data
US 2023/0304617 A1  Sep. 28, 2023

(30) Foreign Application Priority Data
Mar. 24, 2022  (CN) .......................... 202210300728.0

(51) Int. Cl.
*F16L 37/12* (2006.01)
(52) U.S. Cl.
CPC ....... *F16L 37/1225* (2013.01); *F16L 2201/10* (2013.01)
(58) Field of Classification Search
CPC . F16L 37/0885; F16L 37/1225; F16L 37/144; F16L 2201/10
See application file for complete search history.

(56) References Cited

U.S. PATENT DOCUMENTS

| | | |
|---|---|---|
| 2010/0276924 A1 | 11/2010 | Gillet et al. |
| 2017/0146173 A1 | 5/2017 | Chaupin et al. |
| 2019/0242508 A1 | 8/2019 | Gaurat et al. |
| 2022/0003347 A1 | 1/2022 | Barthel et al. |
| 2022/0163153 A1* | 5/2022 | Gauthier ............. F16L 37/1225 |
| 2022/0243850 A1* | 8/2022 | Teasley ............... F16L 37/1225 |

(Continued)

FOREIGN PATENT DOCUMENTS

| | | |
|---|---|---|
| CN | 101876387 A | 11/2010 |
| CN | 107061897 B | 6/2019 |

(Continued)

OTHER PUBLICATIONS

Machine assisted English translation of CN209385877U obtained from https://worldwide.espacenet.com/patent on Nov. 2, 2023, 21 pages.

(Continued)

*Primary Examiner* — Zachary T Dragicevich
(74) *Attorney, Agent, or Firm* — Warner Norcross + Judd LLP

(57) ABSTRACT

A quick connector includes: a connector body for an plug-in member to be inserted therein, the connector body including an indication part; a locking member including a locking leg for locking the plug-in member to the connector body, a movement of the locking leg from an unlocking position to a locking position including an axial movement along insertion direction of the plug-in member and a transverse movement toward the locking position along a transverse direction of the connector body; and a shielding sleeve sleeved outside the connector body. The shielding sleeve is actuated by the locking leg and moved relative to the connector body during the axial and transverse movements. The shielding sleeve is in an initial position when the locking leg is in the unlocking position and in an indication position when the locking leg is in the locking position.

20 Claims, 11 Drawing Sheets

(56) References Cited

U.S. PATENT DOCUMENTS

| | | | | |
|---|---|---|---|---|
| 2022/0299143 | A1* | 9/2022 | Gabbey | F16L 37/144 |
| 2023/0049507 | A1* | 2/2023 | Haglin | F16L 37/144 |
| 2023/0055432 | A1* | 2/2023 | Frederiksen | F16L 37/0885 |
| 2023/0108924 | A1* | 4/2023 | Teasley | F16L 37/1225 |

FOREIGN PATENT DOCUMENTS

| | | |
|---|---|---|
| CN | 110043731 A | 7/2019 |
| CN | 110131509 A | 8/2019 |
| CN | 209213270 U | 8/2019 |
| CN | 209385877 U | 9/2019 |
| CN | 112648460 A | 4/2021 |
| DE | 202020103903 U1 | 7/2020 |
| FR | 3072755 A1 | 4/2019 |

OTHER PUBLICATIONS

Machine assisted English translation of CN209213270U obtained from https://worldwide.espacenet.com/patent on Nov. 2, 2023, 20 pages.

Machine assisted English translation of CN112648460A obtained from https://worldwide.espacenet.com/patent on Nov. 2, 2023, 14 pages.

Machine assisted English translation of CN110043731A obtained from https://worldwide.espacenet.com/patent on Nov. 2, 2023, 16 pages.

Machine assisted English translation of FR3072755A1 obtained from https://worldwide.espacenet.com/patent on Nov. 2, 2023, 9 pages.

* cited by examiner

QUICK CONNECTOR

CROSS-REFERENCE TO RELATED APPLICATIONS

The present application claims the priority to Chinese Patent Application No. 202210300728.0, titled "QUICK CONNECTOR", filed with the China National Intellectual Property Administration on Mar. 24, 2022, which is incorporated herein by reference in its entirety.

RELATED FIELD

The present disclosure generally relates to the technical field of quick connectors.

BACKGROUND

Quick connectors are generally used for connection between pipelines and have various structural forms. Quick connectors are widely used in the field of vehicles, for example, can be used for liquid and/or steam pipelines in vehicles.

At present, self-locking quick connectors have already been developed to achieve simple and quick connection between pipelines. For example, patent document CN107061897B discloses a tube coupling that can achieve automatic locking. The tube coupling disclosed therein includes a female connector with a body into which a male connector having an annular collar is inserted axially, and a connection element that extends in a transverse direction within the body of the female connector. The connection element is designed to interfere mechanically with the collar during insertion of the male connector and to move transversely of its own accord towards the inside of the female connector. The connection element includes a locking hook that co-operates with a locking catch provided in the female connector, and the hook goes past the catch as a result of the mechanical interference of the collar that drives axial and radial elastic deformation of the connection element. The hook locks against catch when the connection element is fully pushed into the female connector.

However, in practical use of the tube coupling, it may occur that the male connector is inserted in place in the female connector, but is not correctly locked to the female connector by the connecting element (that is, the male connector and the female connector of the tube coupling are not correctly connected). The above situation may easily cause disconnection between the male connector and the female connector, and fluid leakage at the junction between the male connector and the female connector.

Therefore, it is desirable to develop a solution that can indicate whether the quick connector is correctly connected.

SUMMARY

An object of the present disclosure is to solve the above issues in the prior art, and to provide an improved quick connector.

Therefore, a quick connector is provided according to the present disclosure. The quick connector includes: a connector body configured to allow an plug-in member to be inserted therein along an axial direction of the connector body, the connector body including an indication part on the outside thereof; a locking member mounted to the connector body, the locking member including a locking leg for locking the plug-in member to the connector body, the locking leg being configured to automatically move from an unlocking position to a locking position due to mechanical interference with the plug-in member during the insertion of the plug-in member into the connector body, a movement of the locking leg from the unlocking position to the locking position including an axial movement along an insertion direction of the plug-in member and a transverse movement toward the locking position along a transverse direction of the connector body; and a shielding sleeve adapted to be sleeved outside the connector body; wherein the shielding sleeve is configured to be actuated by the locking leg and moved relative to the connector body during the axial movement and the transverse movement of the locking leg; wherein the shielding sleeve is in an initial position when the locking leg is in the unlocking position, and the shielding sleeve is in an indication position when the locking leg is in the locking position; wherein the shielding sleeve is configured to at least partially shield the indication part and render the indication part unidentifiable when not reaching the indication position, and to expose the indication part to an identifiable degree when reaching the indication position.

According to this concept, only after the locking leg does make the axial and transverse movements and reach the locking position, the shielding sleeve can reach the indication position and allow the indication part to be identified. In this way, if the indication part is identified, it can be confirmed that the plug-in member is locked correctly (that is, the connector body is correctly connected with the plug-in member); and if the indication part can not be identified, it is indicated that the plug-in member is not locked correctly. Therefore, this can effectively identify the situation of incorrect connection where the plug-in member is inserted in place but is not locked correctly by the locking member, and thus avoid subsequent loosening of the plug-in member and fluid leakage at the connection, due to the incorrect connection.

According to the above technical concept, the present disclosure may further include one or more of the following optional forms.

In some optional forms, the locking leg is configured to first perform the axial movement from the unlocking position and then perform the transverse movement to reach the locking position during the insertion of the plug-in member into the connector body; and the shielding sleeve is configured to move from the initial position toward the indication position along the insertion direction in response to actuation of the locking leg.

In some optional forms, the shielding sleeve includes a first push part, wherein the first push part is configured to be pushed by the locking leg to cause the shielding sleeve to move during the axial movement of the locking leg.

In some optional forms, the first push part includes a push surface substantially perpendicular to the axial direction for contacting the locking leg.

In some optional forms, the shielding sleeve includes a second push part, and the second push part is configured to be pushed by the locking leg to cause the shielding sleeve to move during the transverse movement of the locking leg.

In some optional forms, the second push part is in the form of a slope.

In some optional forms, the second push part is chamfered at a side edge thereof, to reduce the friction between the locking leg and the second pushing part, and to avoid hindering the locking leg from moving transversely towards the locking position.

In some optional forms, the shielding sleeve includes a third push part; wherein the third push part is configured to be pushed by the locking member to cause the shielding sleeve to move during the transverse movement of the locking leg; and wherein the second push part and the third push part are arranged on opposite sides of the shielding sleeve, so that the shielding bushing can be pushed on the opposite sides thereof and be moved more smoothly.

In some optional forms, the third push part includes a push surface inclined with respect to the transverse direction for contacting the locking member.

In some optional forms, the locking member includes a pair of locking legs symmetrically arranged and a connecting part configured to connect the pair of locking legs, and the third push part is configured to be pushed by the connecting part during the transverse movement of the pair of locking legs.

In some optional forms, the third push part is configured to abut against the locking member when the shielding sleeve reaches the indication position, so as to prevent the shielding sleeve from moving along a direction opposite to the insertion direction.

In some optional forms, the connector body includes a retaining notch, and the shielding sleeve includes a retaining protrusion; wherein the retaining protrusion is configured to be engaged with the retaining notch when the shielding sleeve is in the initial position to prevent the shielding sleeve from moving along the insertion direction, and to be disengaged from the retaining notch when the shielding sleeve is actuated by the locking leg to allow the shielding sleeve to move along the insertion direction.

In some optional forms, the shielding sleeve includes a retaining hook, and the retaining hook is configured to be engaged with one side of the retaining notch when the shielding sleeve is in the indication position, so as to prevent the shielding sleeve from moving along the insertion direction.

In some optional forms, the shielding sleeve includes a press part, and the shielding sleeve is configured to elastically deform in response to the press part being pressed, such that the retaining hook is disengaged from the retaining notch.

In some optional forms, the retaining hook is configured to be engaged with another side of the retaining notch when the shielding sleeve is in the initial position, so as to prevent the shielding sleeve from moving along a direction opposite to the insertion direction.

In some optional forms, the shielding sleeve includes a sleeve body and a cantilever extending from the sleeve body.

In some optional forms, the cantilever includes a stop projection at a free end thereof, and the stop projection extends towards the inside of the shielding sleeve; and wherein the locking leg is configured to stop the stop projection when the locking leg is in the unlocking position to prevent the shielding sleeve from moving along the insertion direction, and to release stopping action on the stop projection during the movement of the locking leg from the unlocking position toward the locking position to allow the shielding sleeve to move toward the indication position along the insertion direction.

In some optional forms, the sleeve body is adapted to be sleeved outside the connector body in the direction opposite to the insertion direction; one side of the stop projection is provided with a guide surface configured to guide the stop projection to move over the locking leg when sleeving the shielding sleeve onto the connector body; and another side of the stop projection is provided with a stop surface configured to form a stop structure with the locking leg when the shielding sleeve is in the initial position.

In some optional forms, the shielding sleeve includes a stop section, wherein the stop section is located on a movement path of the locking leg towards the unlocking position when the locking leg is in the locking position.

In some optional forms, the shielding sleeve includes a shielding section, wherein the shielding section is configured to completely shield the indication part when the shielding sleeve is in the initial position, and to completely expose the indication part when the shielding sleeve is in the indication position.

In some optional forms, the shielding sleeve includes a plurality of guide claws, wherein the plurality of guide claws are spaced apart along a peripheral direction of the shielding sleeve, and are configured to slidingly fit with an outer periphery of the connector body to guide the shielding sleeve to move along the insertion direction.

In some optional forms, the indication part includes a machine-identifiable code.

The quick connector according to the present disclosure can effectively indicate whether the quick connector is correctly connected with the plug-in member, and can avoid the subsequent loosening of the plug-in member and fluid leakage at the connection, due to the incorrect connection.

BRIEF DESCRIPTION OF THE DRAWINGS

Other features and advantages of the present disclosure will be readily understood through the following preferred embodiments described in detail with reference to the accompanying drawings, in which the same reference numerals indicate the same or similar components.

DETAILED DESCRIPTION

Figure 1:
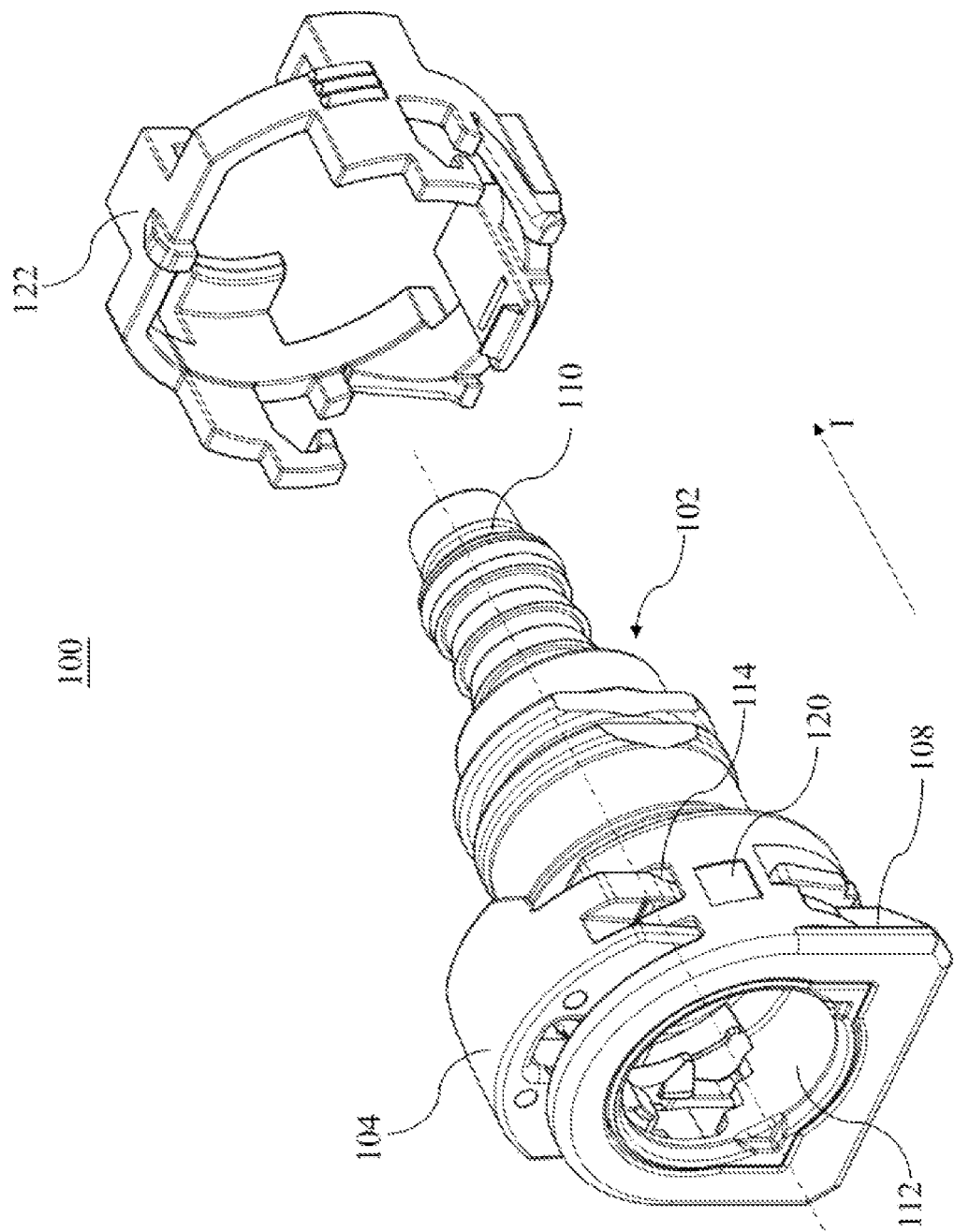
FIG. 1 is a perspective view of a quick connector according to an exemplary embodiment of the present disclosure, wherein a shielding sleeve is not assembled on a connector body.

The implementation and usage of the embodiments are discussed in detail below. However, it is conceivable that the specific embodiments discussed are merely intended to illustrate specific ways of implementing and using the present disclosure, and are not intended to limit the scope of the present disclosure. When describing structures and positions of components, the direction-related expressions herein, such as "upper", "lower", "top", and "bottom", are not absolute, but relative. When the components are arranged as shown in the drawings, these direction-related expressions are appropriate, but when the positions of these components in the drawings are altered, these direction-related expressions should be altered accordingly.

In the present disclosure, the axial direction of a tubular or annular component refers to the direction parallel to the central axis of the component, the peripheral direction of the tubular or annular component refers to the direction along the perimeter of the component, the radial direction of the tubular or annular component refers to the direction passing through the central axis of the component and perpendicular to the axial direction of the component, and the transverse direction of the tubular or annular component refers to the direction substantially perpendicular to the axial direction of the component.

The accompanying drawings illustrate a quick connector according to the present disclosure. The quick connector shown in and discussed with regard to the accompanying drawings is suitable for various applications, including but not limiting to those in the automotive field. Specifically, the quick connector can be applied in any circumstances where a first fluid pipeline is required to be connected with a second fluid pipeline. Such circumstances include, but are not limited to, aircrafts, motor vehicles and ships. Other circumstances include factories, commercial districts, and residential districts.

The quick connector may be a self-locking quick connector that can be connected with a plug-in member (such as a tubular plug-in member). That is, a locking member of the quick connector can automatically move toward the locking position in response to the insertion of the plug-in member into the quick connector, so as to finally lock the plug-in member in the quick connector without manually operate the locking member. The configuration of a self-locking quick connector has been disclosed by CN107061897B, which will not be described herein.

FIG. 1 shows a quick connector 100 according to an exemplary embodiment of the present disclosure. With reference to FIG. 1, the quick connector 100 includes a connector body 102 and a locking member 104 mounted to the connector body 102. The connector body 102 has a first axial end 108 and a second axial end 110. The first axial end 108 may receive the plug-in member (not shown) and be connected with the plug-in member. The plug-in member may be in fluid communication with a first fluid pipeline. The plug-in member may have, for example, a tubular shape, and have a peripheral flange provided on the outer periphery of the plug-in member for connecting/locking with the quick connector 100. The second axial end 110 may be in fluid communication with a second fluid pipeline (such as a soft tube). In this way, when the quick connector 100 and the plug-in member are connected/locked with each other, the first fluid pipeline is in fluid communication with the second fluid pipeline.

In the illustrated embodiment, the connector body 102 has a substantially straight tubular shape. It can be understood that the connector body 102 may also has a curved tubular shape or other suitable shapes.

A receiving hole 112 and a receiving passage 114 are defined in the connector body 102. The plug-in member may be inserted into the receiving hole 112 along the axial direction of the connector body 102. The insertion direction I of the plug-in member is the direction along the axial direction of the connector body 102 towards the second axial end 110. The locking member 104 may be inserted into the receiving passage 114 in the transverse direction T which is substantially perpendicular to the axial direction, and is movable in the receiving passage 114.

Figure 10:
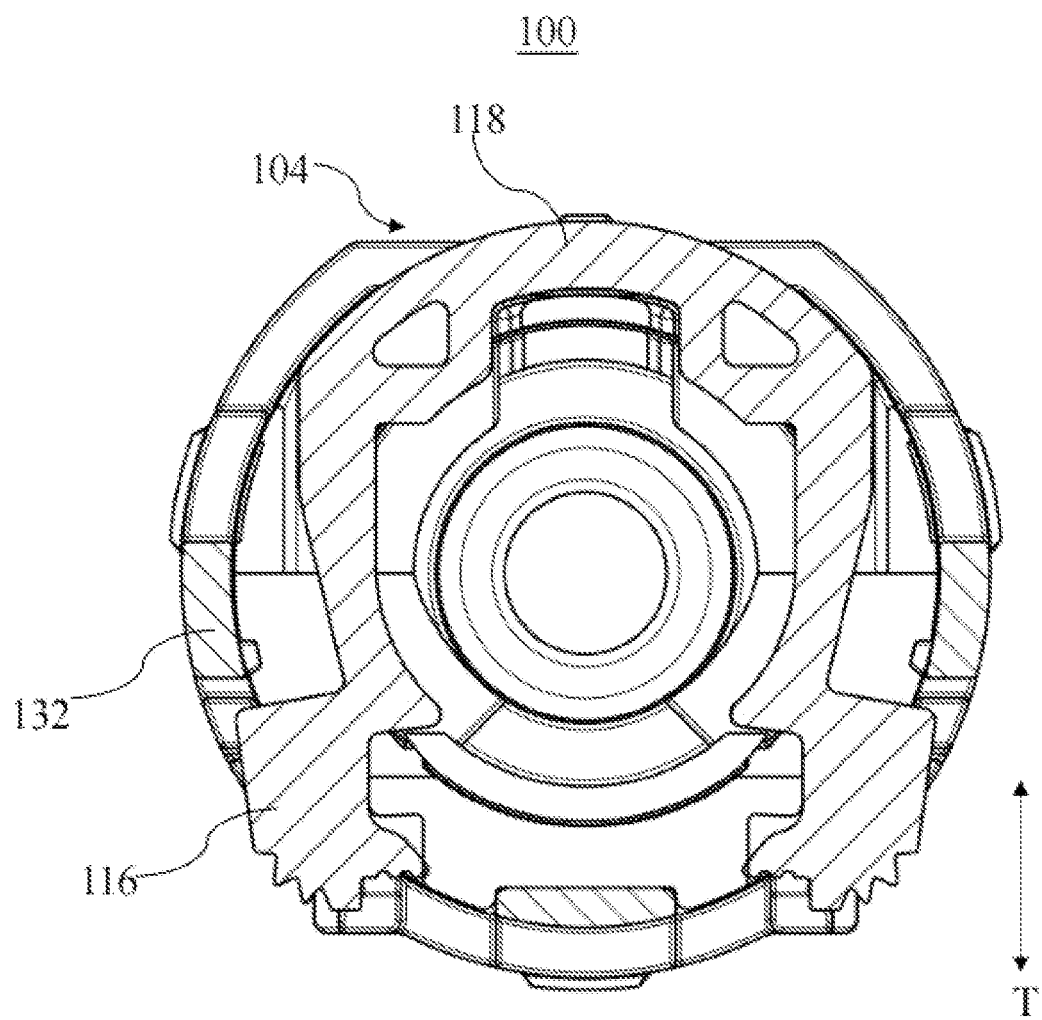
FIG. 10 is a section view of the quick connector in FIG. 8.

With reference to FIG. 10, the locking member 104 has locking legs 116 for locking the plug-in member to the connector body 102. The locking member 104 may include a pair of locking legs 116 symmetrically arranged and a connecting part 118 configured to connect the pair of locking legs 116. The two locking legs 116 of the locking member 104 can automatically move from the unlocking position to the locking position through mechanical interference with the plug-in member during the insertion of the plug-in member into the receiving hole 112 of the connector body 102.

In some embodiments, during the insertion of the plug-in member into the receiving hole 112 of the connector body 102, the two locking legs 116 of the locking member 104 first move along the insertion direction I of the plug-in member due to mechanical interference with the peripheral flange of the plug-in member; with the further insertion of the plug-in member, the two locking legs 116 gradually move away from each other and radially and elastically deform/move radially towards the outside of the connector body 102; in response to the radial elastic deformation, the two locking legs 116 have a tendency to move downward towards the locking position along the transverse direction T; finally, when the plug-in member is inserted in place in the connector body 102, the two locking legs 116 move to the locking position and lock the plug-in member in the connector body 102, thus realizing the correct connection between the quick connector 100 and the plug-in member. In other words, the movement of the locking legs 116 from the unlocking position to the locking position includes an initial axial movement along the insertion direction I of the plug-in member and then a transverse movement along the transverse direction T of the connector body 102 towards the locking position.

Figure 4:
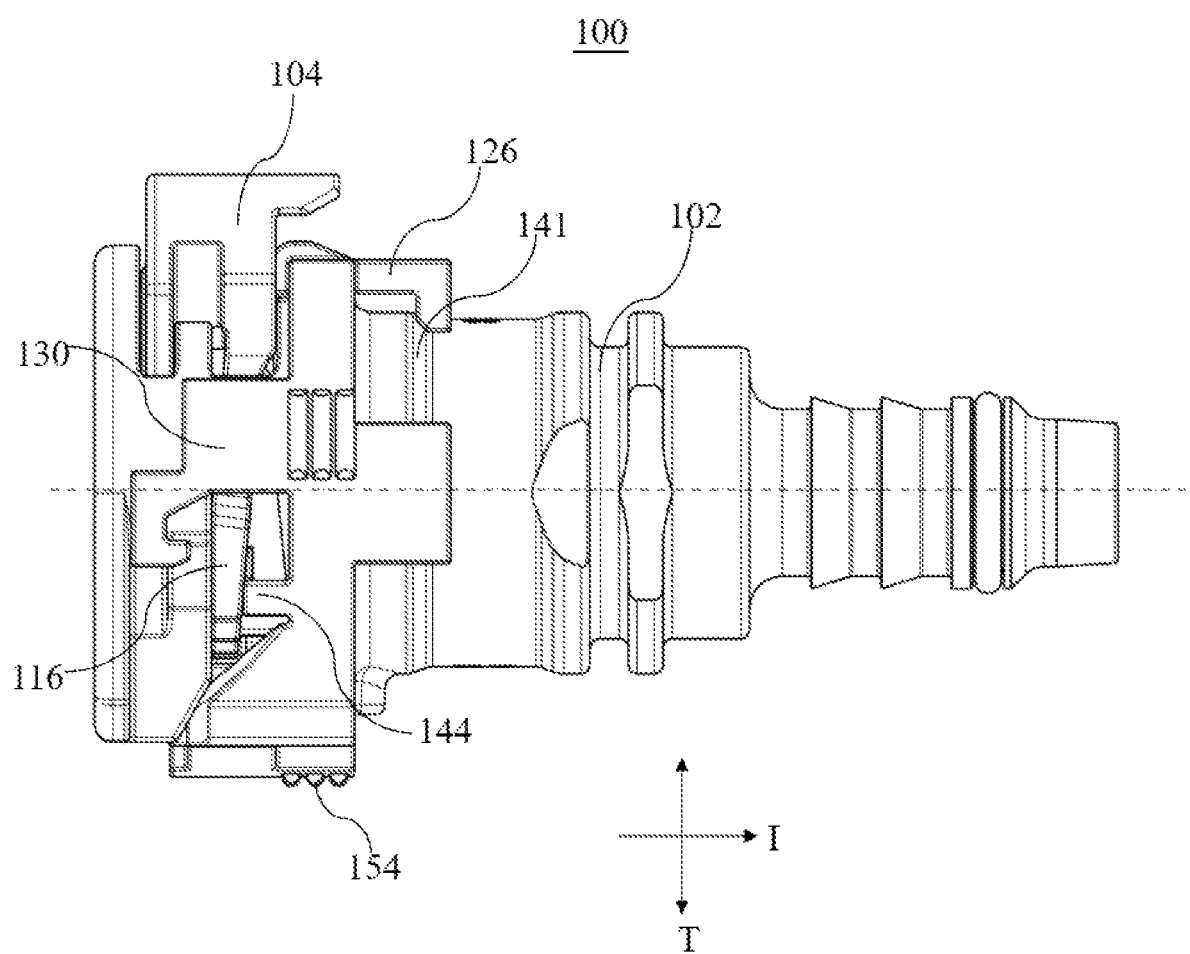
FIG. 4 is a side view of the quick connector according to the exemplary embodiment of the present disclosure, wherein the shielding sleeve is in an initial position, and the locking leg is in an unlocking position.
Figure 8:
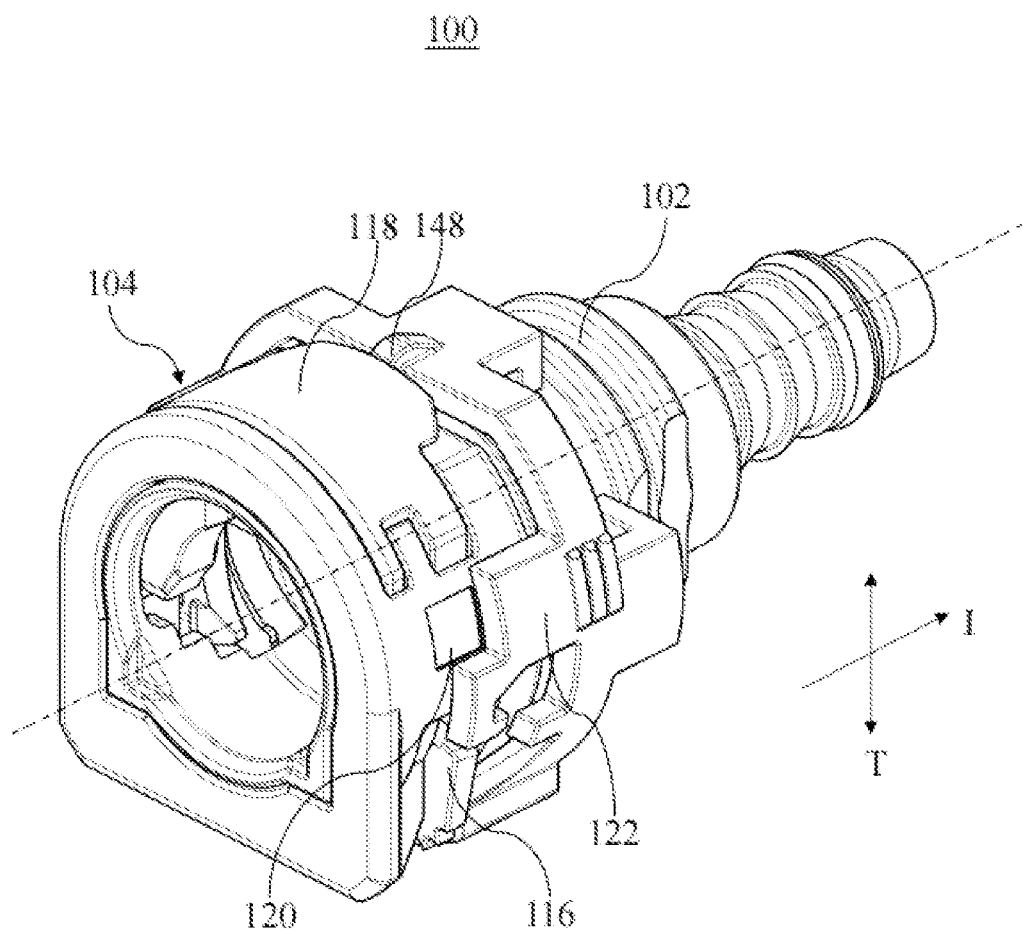
FIG. 8 is a perspective view of the quick connector according to the exemplary embodiment of the present disclosure, wherein the shielding sleeve has reached the indication position, and the locking leg has reached the locking position.

With reference to FIG. 1, FIG. 4, and FIG. 8, an indication part 120 is provided on the outside of the connector body 102. Accordingly, the quick connector 100 may include a shielding sleeve 122 which can be sleeved outside the connector body 102. The shielding sleeve 122 can cooperate with the indication part 120 to indicate whether the quick connector 100 is correctly connected with the plug-in member.

The shielding sleeve 122 may be configured to be actuated by the locking leg 116 and moved relative to the connector body 102 during the axial movement and the transverse movement of the locking legs 116. As shown in FIG. 4, the shielding sleeve 122 is in the initial position, when the locking legs 116 are in the unlocking position, and as shown in FIG. 8, the shielding sleeve 122 is in the indication position, when the locking legs 116 reach the locking position. The shielding sleeve 122 at least partially shields the indication part 120 and renders/makes the indication part 120 unidentifiable when not reaching the indication position; and the shielding sleeve 122 exposes the indication part 120 to an identifiable degree when reaching the indication position. In other words, when the locking legs 116 move towards the locking position, the shielding sleeve 122 can correspondingly move relative to the connector body 102 in the insertion direction I, and expose the indication part 120 to an identifiable degree only after the locking legs 116 have experienced/made the axial movement and the transverse movement and reached the locking position. In this way, if the indication part 120 can be identified, it can be confirmed that the plug-in member has been locked correctly (that is, the connector body 102 is correctly connected with the plug-in member); and if the indication part 120 can not be identified, it is indicated that the plug-in member has not been locked correctly. Therefore, this can effectively identify the situation of incorrect connection where the plug-in member is inserted in place but is not locked correctly by the locking member 104, and thus avoid the subsequent loosening of the plug-in member and fluid leakage at the connection, due to the incorrect connection.

In the illustrated embodiment, the shielding sleeve 122 would move from the initial position toward the indication position along the insertion direction I in response to the actuation of the locking legs 116.

Figure 2:
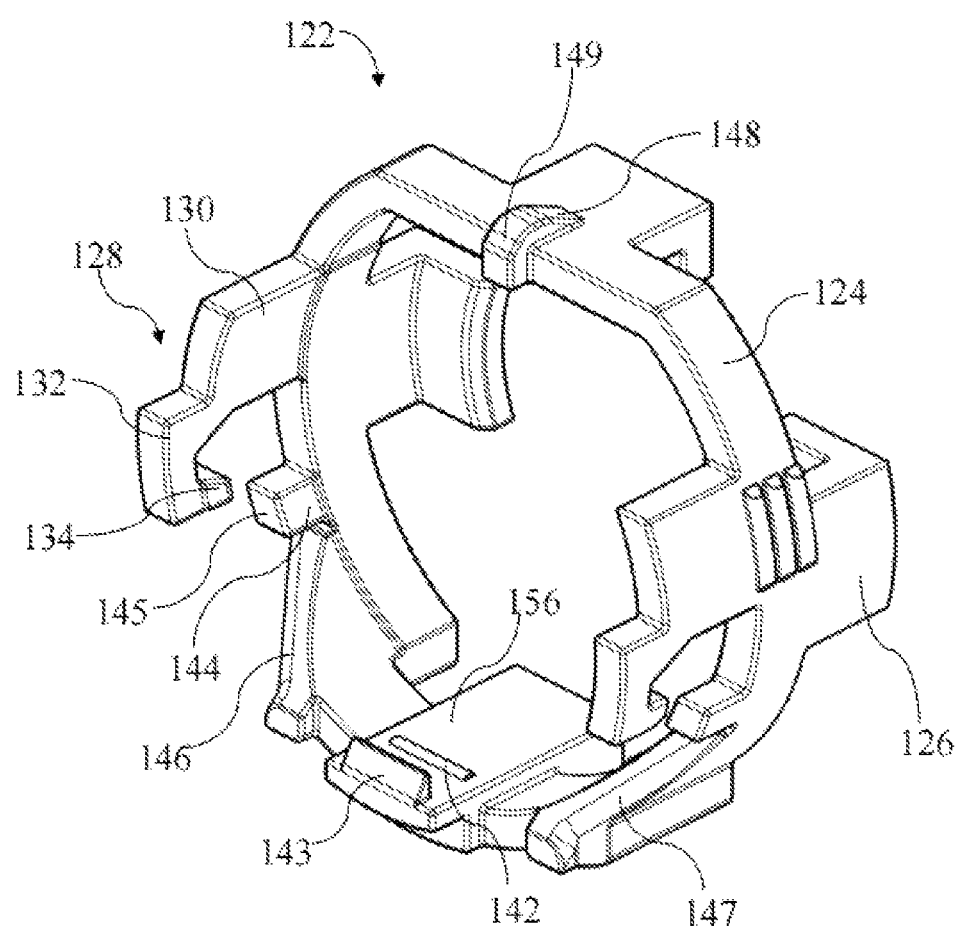
FIG. 2 is a perspective view of the shielding sleeve of the quick connector according to the exemplary embodiment of the present disclosure.
Figure 3:
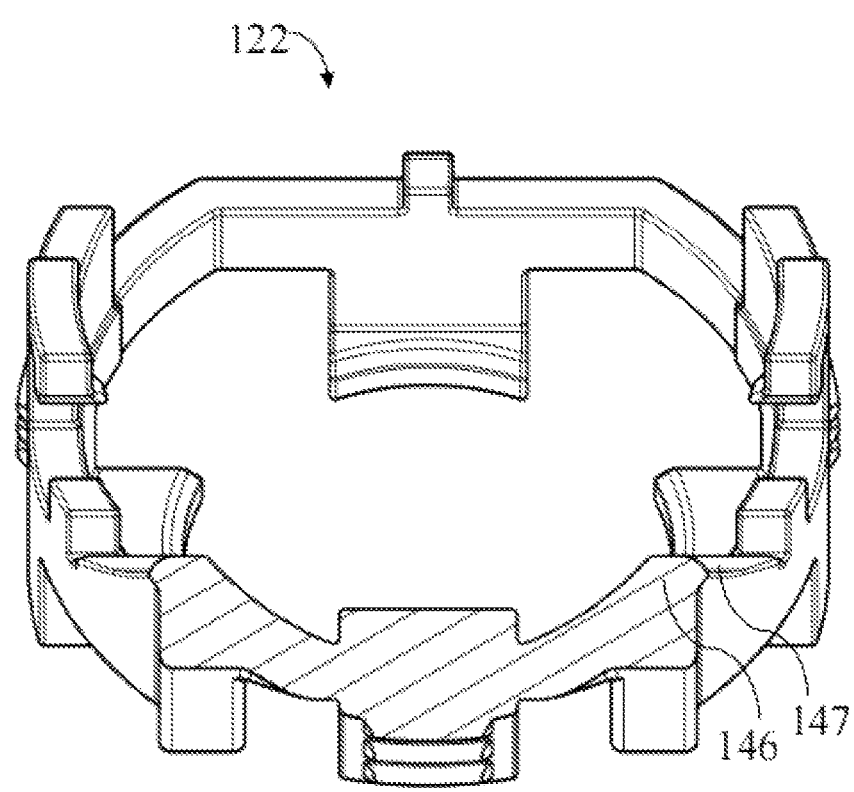
FIG. 3 is a partial section view of the shielding sleeve of the quick connector according to the exemplary embodiment of the present disclosure.

With reference to FIG. 2 to FIG. 4, the shielding sleeve 122 may have a sleeve body 124 that is substantially annular. The shielding sleeve 122 may further include a plurality of guide claws 126. The guide claws 126 are spaced apart along a peripheral direction of the sleeve body 124, and are configured to slidingly fit with the outer periphery of the connector body 102 to guide the shielding sleeve 122 to move along the insertion direction I.

In the illustrated embodiment, the shielding sleeve 122 may include two cantilevers 128 extending from the sleeve body 124 and symmetrically arranged. Each cantilever 128 may have a shielding section 130, and the shielding section 130 may extend from the sleeve body 124 and have a shape matching the indication part 120. Optionally, the shielding section 130 is configured to completely shield the indication part 120 when the shielding sleeve 122 is in the initial position, and to completely expose the indication part 120 when the shielding sleeve 122 is in the indication position. The indication part 120 may have a machine-identifiable code, such as bar code, two-dimension code, and other machine-identifiable code. The machine-identifiable code can be provided by printing, labeling, engraving and other appropriate methods. The indication part 120 may also have symbols, patterns, words, etc. that can be identified by human eyes, so that it can be quickly determined whether the quick connector 100 is correctly connected by visual inspection.

Each cantilever 128 may have a stop section 132 connected to the shielding section 130. Each cantilever 128 may further have a stop projection 134 extending towards the inside of the shielding sleeve 122. In the illustrated embodiment, the stop section 132 may be substantially elbow shaped. The stop projection 134 may be provided at an end of the stop section 132. The functions of the stop sections 132 and the stop projections 134 of the cantilevers 128 will be described below.

Figure 6:
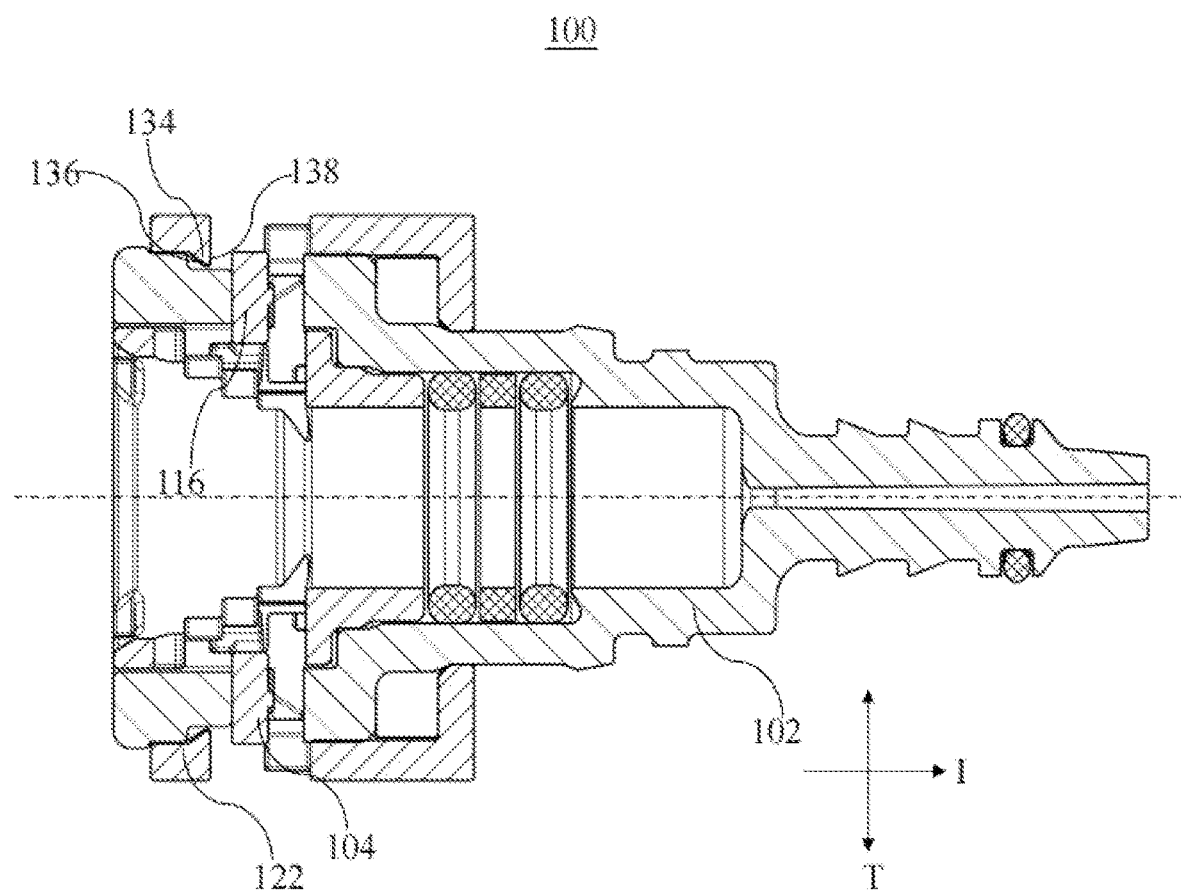
FIG. 6 is another section view of the quick connector in FIG. 4.

With reference to FIG. 1, FIG. 2, and FIG. 6, while assembling the quick connector 100, the locking member 104 is first mounted to the connector body 102, such that the locking legs 116 of the locking member 104 are in the unlocking position, and then, the sleeve body 124 of the shielding sleeve 122 is sleeved outside the connector body 102 in the direction opposite to the insertion direction I, such that the shielding sleeve 122 is in the initial position.

During the process of sleeving the shielding sleeve 122 onto the connector body 102 in the direction opposite to the insertion direction I, the shielding sections 130 and stop sections 132 of the shielding sleeve 122 can move over the locking legs 116 in the unlocking position without interference; however, the stop projections 134 of the shielding sleeve 122 interfere with the locking legs 116, which causes the cantilevers 128 of the shielding sleeve 122 to elastically deform and therefore expand outward, thus allowing the stop projections 134 to move over the locking legs 116 and thus allowing the shielding sleeve 122 to move to the initial position. Then, the cantilevers 128 of the shielding sleeve 122 recover from the deformation, and the stop projections 134 form a stop structure with the locking legs 116. In other words, when the locking legs 116 are in the unlocking position, the locking legs 116 can stop the stop projections 134 to prevent the shielding sleeve 122 from moving away from the connector body 102 along the insertion direction I. During the movement of the locking legs 116 from the unlocking position toward the locking position, the locking legs 116 can release the stopping action on the stop projections 134, allowing the shielding sleeve 122 to move toward the indication position along the insertion direction I. As shown in FIG. 6, in the illustrated embodiment, one side of the stop projection 134 may be provided with a guide surface 136 inclined relative to the axial direction to guide the stop projection 134 to move over the locking leg 116. Another side of the stop projection 134 is provided with a stop surface 138 substantially perpendicular to the axial direction to form a stop structure with the locking leg 116.

Figure 5:
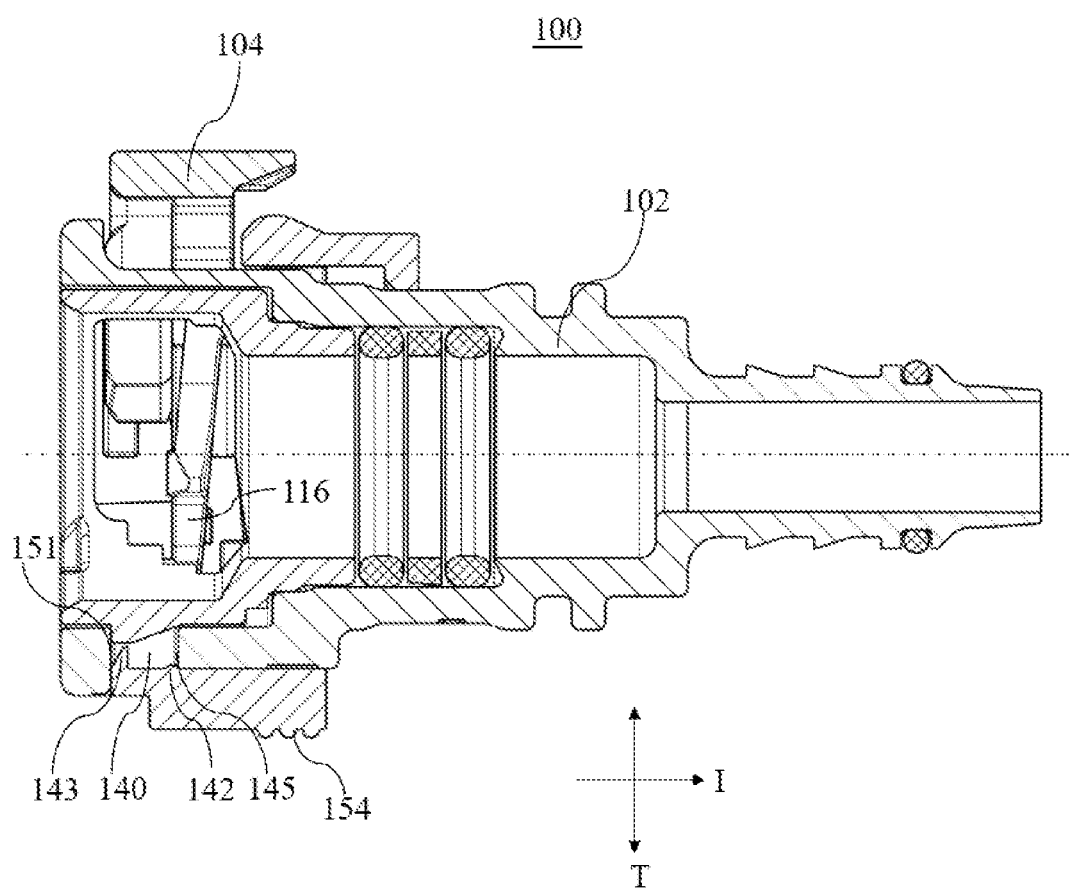
FIG. 5 is a section view of the quick connector in FIG. 4.

As shown in FIG. 4 to FIG. 6, the shielding sleeve 122 is in the initial position, and the locking legs 116 are in the unlocking position. With reference to FIG. 2, and FIGS. 4-6, the connector body 102 may be provided with a retaining notch 140, and the shielding sleeve 122 may be provided with a retaining protrusion 142 and a retaining hook 143. In the illustrated embodiment, the retaining notch 140 may be provided at the bottom of the connector body 102 and may penetrate through the peripheral wall of the connector body 102. The retaining notch 140 may have a first side 145 and a second side 151 which are opposite to each other. The retaining protrusion 142 and the retaining hook 143 may be spaced apart at the bottom of the shielding sleeve 122.

As shown in FIG. 4 and FIG. 5, the retaining protrusion 142 is engaged with the first side 145 of the retaining notch 140 when the shielding sleeve 122 is in the initial position, so as to prevent the shielding sleeve 122 from moving away from the initial position along the insertion direction I. And the retaining protrusion 142 is disengaged from the retaining notch 140 when the shielding sleeve 122 is actuated by the locking legs 116, so as to allow the shielding sleeve 122 to move toward the indication position along the insertion direction I. In the illustrated embodiment, the retaining protrusion is only slightly raised. The retaining hook 143 is engaged with the second side 151 of the retaining notch 140 when the shielding sleeve 122 is in the initial position, so as to prevent the shielding sleeve 122 from moving along the direction opposite to the insertion direction I. In addition, the guide claws 126 of the shielding sleeve 122 may abut against a stepped surface 141 on the connector body 102 when the shielding sleeve 122 is in the initial position, so as to prevent the shielding sleeve 122 from moving along the direction opposite to the insertion direction I. In this way, the shielding sleeve 122 can be kept in the initial position.

With reference to FIG. 2 and FIG. 4, the shielding sleeve 122 may include a first push part 144. The first push part 144 is configured to be pushed by the locking leg 116 to cause the shielding sleeve 122 to move during the axial movement of the locking leg 116 along the insertion direction I. In the illustrated embodiment, the first push part 144 may protrude substantially axially from the middle of the sleeve body 124. The first push part 144 may have a push surface 145 substantially perpendicular to the axial direction for contacting the locking leg 116. In this way, during the axial movement of the locking leg 116, the locking leg 116 can contact and push the first push part 144 forward with a large contact area, so that the shielding sleeve 122 can be easily pushed to move, specifically, the retaining protrusion 142 can be easily disengaged from the retaining notch 140 to allow the shielding sleeve 122 to move along the insertion direction I.

Figure 7:
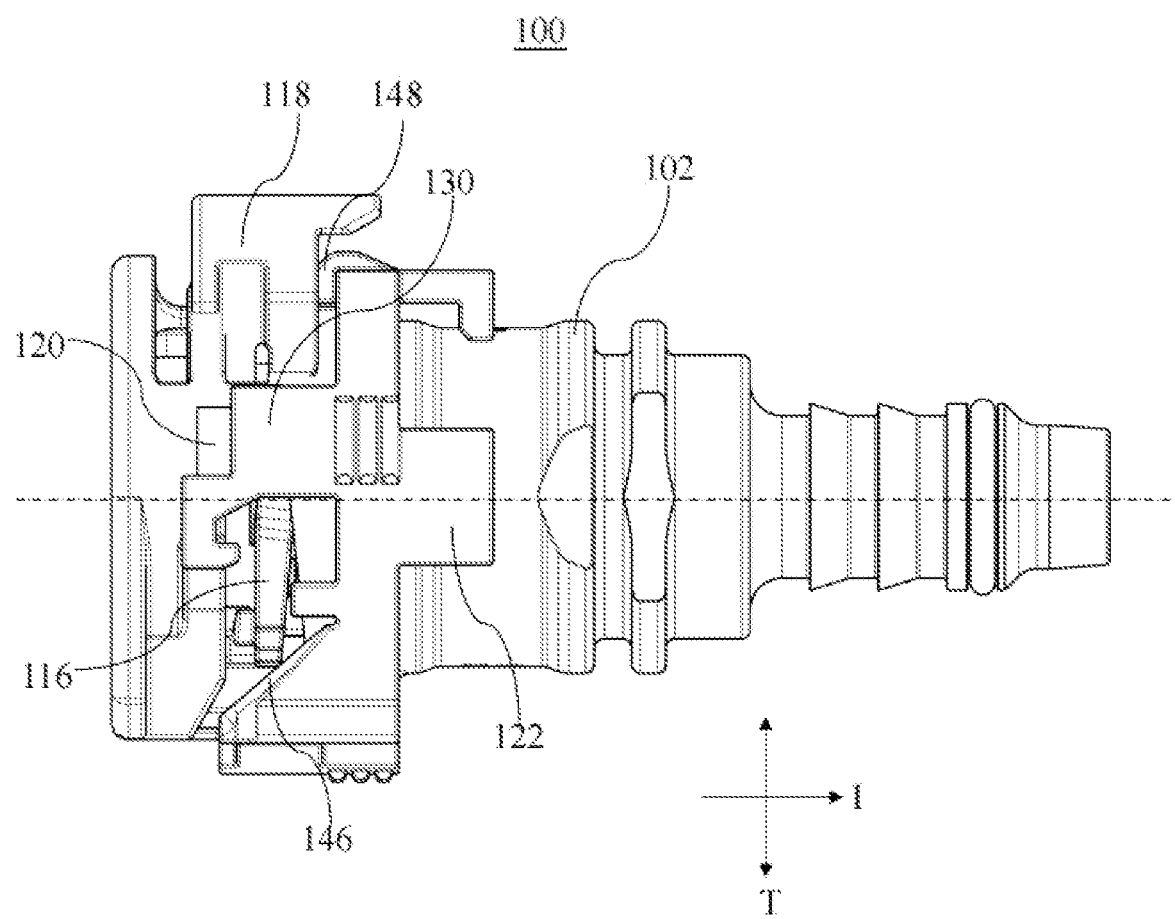
FIG. 7 is a perspective view of the quick connector according to the exemplary embodiment of the present disclosure, wherein the shielding sleeve has left the initial position but has not reached the indication position, and the locking leg has left the unlocking position but has not reached the locking position.

With reference to FIG. 2, FIG. 3, and FIG. 7 (in FIG. 7, the shielding sleeve 122 has left the initial position but has not reached the indication position), the shielding sleeve 122 may include a second push part 146. The second push part 146 is configured to be pushed by the locking leg 116 to cause the shielding sleeve 122 to move during the transverse movement of the locking leg 116 toward the locking position. In the illustrated embodiment, the second push part 146 may be provided at the lower middle part of the sleeve body 124, and may be in the form of a slope. The second push part 146 may be chamfered at a side edge 147 thereof, to reduce the contact area between the locking leg 116 and the second push part 146 when the locking leg 116 pushes the second push part 146, thus further reducing the friction between the locking leg 116 and the second push part 146, and avoiding hindering the locking leg 116 from automatically moving towards the locking position along the transverse direction T.

In the illustrated embodiment, the shielding sleeve 122 has two symmetrically arranged first pushing parts 144 and two symmetrically arranged second pushing parts 146.

With reference to FIG. 2, and FIGS. 8-11 (in FIGS. 8-11, the shielding sleeve 122 has left the initial position but has not reached the indication position), the shielding sleeve 122 may further include a third push part 148. The third push part 148 is configured to be pushed by the locking member 104 to cause the shielding sleeve 122 to move during the transverse movement of the locking leg 116 toward the locking position. The third push part 148 may have a push surface 149 inclined with respect to the transverse direction T for contacting the locking member 104. In the illustrated embodiment, the push surface 149 of the third push part 148 is curved. The third push part 148 may be provided at the upper part of the sleeve body 124, and may be pushed by the connecting part 118 of the locking member 104. The second push part 146 and the third push part 148 may be provided on opposite sides of the shielding sleeve 122, respectively. In this way, during the transverse movement of the locking legs 116 toward the locking position, the shielding sleeve 122 can be pushed on opposite sides through the second push parts 146 and the third push part 148, so that the shielding sleeve 122 can move relatively easily and smoothly towards the indication position.

Figure 9:
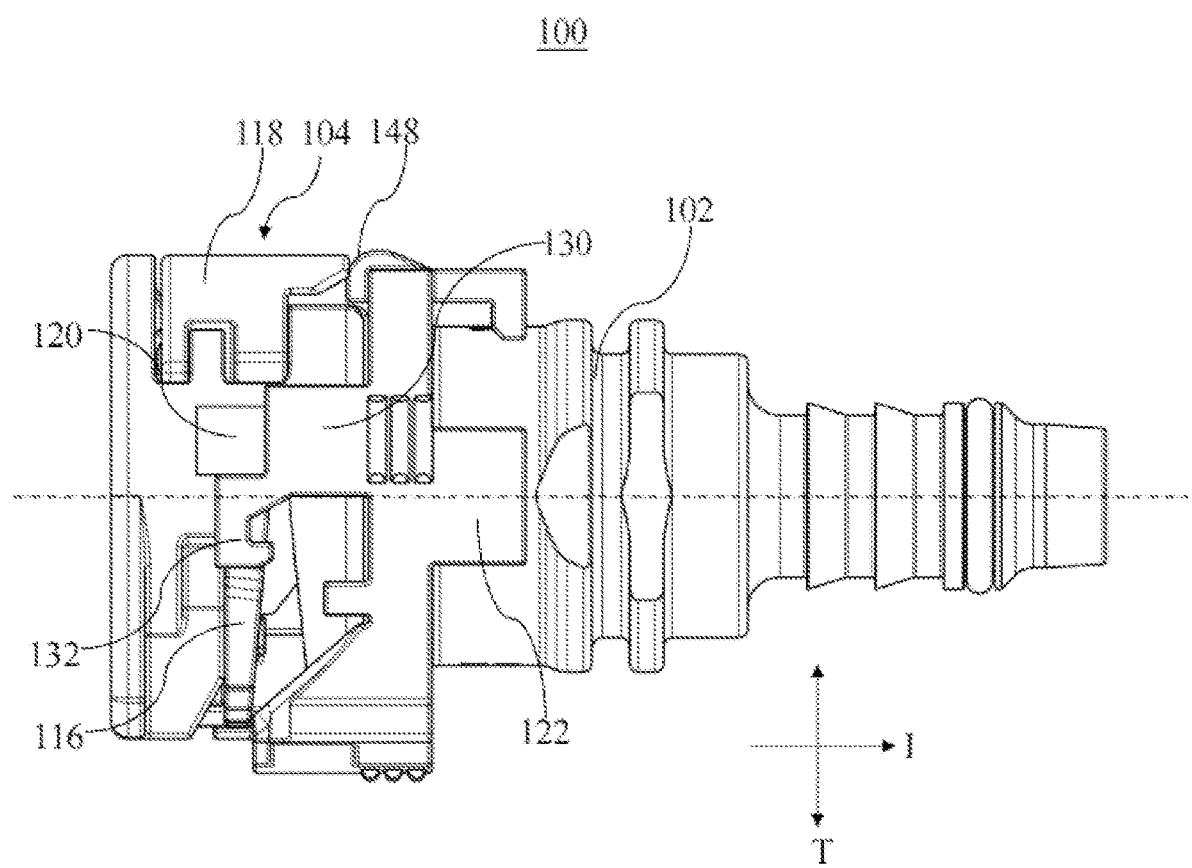
FIG. 9 is a side view of the quick connector in FIG. 8.

With reference to FIG. 9, the third push part 148 of the shielding sleeve 122 abuts against the connecting part 118 of the locking member 104 when the shielding sleeve 122 reaches the indication position, so as to prevent the shielding sleeve 122 from moving along the direction opposite to the insertion direction I. Besides, with reference to FIG. 11, the retaining hook 143 is engaged with the first side 145 of the retaining notch 140 when the shielding sleeve 122 reaches the indication position, so as to prevent the shielding sleeve 122 from moving away from the indication position along the insertion direction I. In this way, the shielding sleeve 122 can be kept in the indication position.

With reference to FIG. 10, the stop section 132 of the shielding sleeve 122 may be configured such that the stop section 132 is located on a movement path of the locking leg 116 towards the unlocking position when the locking leg 116 is in the locking position, so as to prevent the locking leg 116 from moving toward the unlocking position. In this way, the stop section 132 of the shielding sleeve 122 can provide enhanced locking for the quick connector 100 and the plug-in member. In the illustrated embodiment, the stop section 132 is located above the locking leg 116 when the locking leg 116 is in the locking position.

Figure 11:
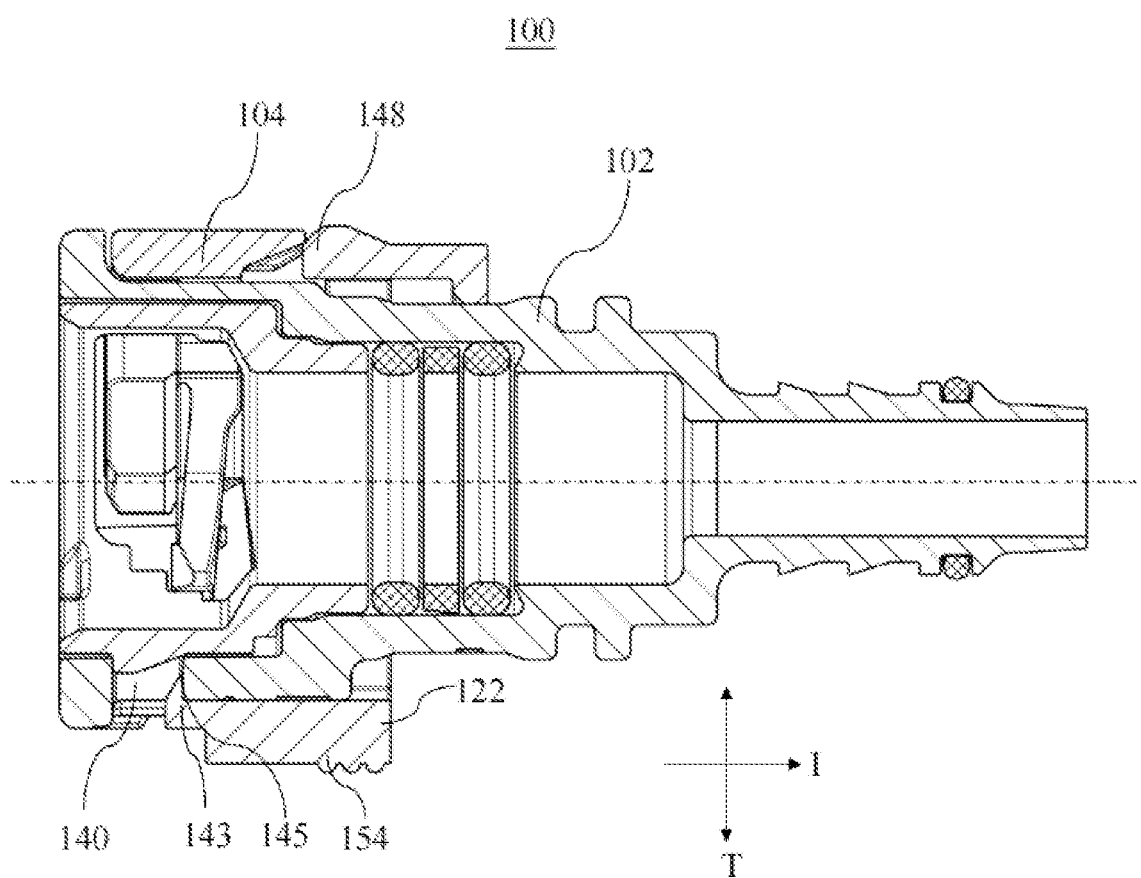
FIG. 11 is another section view of the quick connector in FIG. 8.

With reference to FIG. 2 and FIG. 11, the shielding sleeve 122 is further provided with a press part 154, and the shielding sleeve 122 is configured to elastically deform in response to the press part 154 being pressed, such that the retaining hook 143 is disengaged from the retaining notch 140. In this way, when it is desired to separate the quick connector 100 from the plug-in member which are locked with each other, the shielding sleeve 122 in the indication position may be removed by pressing the press part 154, then the locking legs 116 in the locking position may be moved to the unlocking position, and in turn the quick connector 100 may be disconnected from the plug-in member. In the illustrated embodiment, the shielding sleeve 122 may include a plate-shaped section 156. The plate-shaped section 156 may extend substantially axially and be integrated with the sleeve body 124. The retaining hook 143 and the press part 154 may be provided at opposite ends of the plate-shaped section 156, respectively, to allow the retaining hook 143 to be disengaged from the retaining notch 140 by means of lever effect by pressing the press part 154.

The manner in which the quick connector 100 according to the present disclosure indicates whether the quick connector 100 is correctly connected with the plug-in member is described below in conjunction with FIGS. 4 to 11.

With reference to FIGS. 4 to 6, the quick connector 100 is first assembled as described above, such that the locking legs 116 are in the unlocking position and the shielding sleeve 122 is in the initial position. The shielding sleeve 122 can be kept in the initial position by means of the retaining protrusion 142, the retaining hook 143, and the guide claws 126. At this time, the shielding section 130 of the shielding sleeve 122 completely shields the indication part 120, making the indication part 120 unidentifiable.

During the insertion of the plug-in member into the receiving hole 112 of the quick connector 100, the locking legs 116 of the locking member 104 mechanically interfere with the plug-in member, and therefore move first along the insertion direction I and then move downward along the transverse direction T towards the locking position.

The first push parts 144 of the shielding sleeve 122 are first pushed due to the movement of the locking legs 116 along the insertion direction I, so that the retaining protrusion 142 of the shielding sleeve 122 is disengaged from the retaining notch 140, allowing the shielding sleeve 122 to move along the insertion direction I.

Then, with reference to FIG. 7, as the locking legs 116 move downward in the transverse direction T, the locking legs 116 release the stopping action on the shielding sleeve 122 (more specifically, the stop projections 134 of the shielding sleeve 122), and then contact and push the second push parts 146 of the shielding sleeve 122. Due to the slope structure of the second push parts 146, the shielding sleeve 122 moves further in the insertion direction I relative to the connector body 102 when being pushed transversely by the locking legs 116. In addition, as the locking legs 116 move further downward in the transverse direction T, the connecting part 118 of the locking member 104 further contacts and pushes the third push part 148 of the shielding sleeve 122.

At this time, the shielding sleeve 122 is pushed on its upper and lower sides and therefore moves smoothly in the insertion direction I.

Finally, with reference to FIGS. 8 to 11, when the locking legs 116 reach the locking position, the quick connector 100 and the plug-in member are locked/correctly connected with each other, and the shielding sleeve 122 reaches the indication position. The shielding sleeve 122 is kept in the indication position by means of the retaining hook 143 and the third push part 148. And the stop sections 132 of the shielding sleeve 122 are located above the locking legs 116, so that the locking legs 116 are prevented from moving towards the unlocking position, thus providing enhanced locking for the quick connector 100 and the plug-in member. At this time, the shielding section 130 of the shielding sleeve 122 moves away from the indication part 120, so that the indication part 120 is completely exposed and the machine-identifiable code on the indication part 120 can be identified.

In this way, after the connection of the quick connector 100 with the plug-in member is completed, a machine can be used to scan and identify the code. If the code is identified, it is indicated that the shielding sleeve 122 has reached the indication position, in other words, the locking legs 116 have completed/made the axial movement and the transverse movement and reached the locking position, thus indicating that the quick connector 100 and the plug-in member are correctly connected. If the code is not identified, it is indicated that the quick connector 100 and the plug-in member are not connected correctly.

It should also be understood that the various components and features described herein can be made of a variety of materials, including, but not limited to, polymer, rubber, metal and other suitable materials or combinations of materials familiar to those skilled in the art. The embodiments shown in FIGS. 1 to 11 only illustrate the shape, size and arrangement of each optional component of the quick connector according to the present disclosure. However, these embodiments are merely intended to illustrate, rather than to limit. Other shapes, sizes and arrangements may be adopted without departing from the idea and scope of the present disclosure.

The technical contents and technical features of the present disclosure have been disclosed above. However, it can be understood that, those skilled in the art can make various changes and improvements to the above-disclosed concept under the creative concept of the present disclosure, and all these various changes and improvements still fall within the scope of protection of the present disclosure. The description of the foregoing embodiments is illustrative rather than restrictive, and the scope of protection of the present disclosure is determined by the appended claims.

The invention claimed is:

1. A quick connector, comprising:
a connector body configured to allow a plug-in member to be inserted therein along an axial direction of the connector body, the connector body comprising an indication part on an outside thereof;
a locking member mounted to the connector body, the locking member comprising a locking leg for locking the plug-in member to the connector body, the locking leg being configured to automatically move from an unlocking position to a locking position due to mechanical interference with the plug-in member during an insertion of the plug-in member into the connector body, a movement of the locking leg from the unlocking position to the locking position comprising an axial movement along an insertion direction of the plug-in member and a transverse movement toward the locking position along a transverse direction of the connector body; and
a shielding sleeve adapted to be sleeved outside the connector body;
wherein the shielding sleeve is configured to be actuated by the locking leg and moved in the axial direction relative to the connector body during the axial movement and the transverse movement of the locking leg; wherein the shielding sleeve is in an initial position when the locking leg is in the unlocking position, and the shielding sleeve is in an indication position when the locking leg is in the locking position, wherein in the indication position the shielding sleeve is shifted in the axial direction of the connector body relative to the initial position; wherein the shielding sleeve is configured to at least partially shield the indication part and render the indication part unidentifiable when not reaching the indication position, and to expose the indication part to an identifiable degree when reaching the indication position.

2. The quick connector according to claim 1, wherein the locking leg is configured to first perform the axial movement from the unlocking position and then perform the transverse movement to reach the locking position during the insertion of the plug-in member into the connector body; and the shielding sleeve is configured to move from the initial position toward the indication position along the insertion direction in response to actuation of the locking leg.

3. The quick connector according to claim 2, wherein the shielding sleeve comprises a first push part, wherein the first push part is configured to be pushed by the locking leg to cause the shielding sleeve to move during the axial movement of the locking leg.

4. The quick connector according to claim 3, wherein the first push part comprises a push surface substantially perpendicular to the axial direction for contacting the locking leg.

5. The quick connector according to claim 3, wherein the shielding sleeve comprises a second push part, and the second push part is configured to be pushed by the locking leg to cause the shielding sleeve to move during the transverse movement of the locking leg.

6. The quick connector according to claim 5, wherein the second push part is in the form of a slope.

7. The quick connector according to claim 6, wherein the second push part is chamfered at a side edge thereof.

8. The quick connector according to claim 5, wherein the shielding sleeve comprises a third push part; wherein the third push part is configured to be pushed by the locking member to cause the shielding sleeve to move during the transverse movement of the locking leg; and wherein the second push part and the third push part are arranged on opposite sides of the shielding sleeve.

9. The quick connector according to claim 8, wherein the third push part comprises a push surface inclined with respect to the transverse direction for contacting the locking member.

10. The quick connector according to claim 8, wherein said locking leg is a first locking leg, and the locking member further comprises a second locking leg which together with the first locking leg form a pair of locking legs symmetrically arranged and a connecting part configured to connect the pair of locking legs, and the third push part is configured to be pushed by the connecting part during the transverse movement of the pair of locking legs.

11. The quick connector according to claim 8, wherein the third push part is configured to abut against the locking member when the shielding sleeve reaches the indication position, so as to prevent the shielding sleeve from moving along a direction opposite to the insertion direction.

12. The quick connector according to claim 2, wherein the connector body comprises a retaining notch, and the shielding sleeve comprises a retaining protrusion; wherein the retaining protrusion is configured to be engaged with the retaining notch when the shielding sleeve is in the initial position to prevent the shielding sleeve from moving along the insertion direction, and to be disengaged from the retaining notch when the shielding sleeve is actuated by the locking leg to allow the shielding sleeve to move along the insertion direction.

13. The quick connector according to claim 12, wherein the shielding sleeve comprises a retaining hook, and the retaining hook is configured to be engaged with one side of the retaining notch when the shielding sleeve is in the indication position, so as to prevent the shielding sleeve from moving along the insertion direction.

14. The quick connector according to claim 13, wherein the shielding sleeve comprises a press part, and the shielding sleeve is configured to elastically deform in response to the press part being pressed such that the retaining hook is disengaged from the retaining notch.

15. The quick connector according to claim 13, wherein the retaining hook is configured to be engaged with another side of the retaining notch when the shielding sleeve is in the initial position, so as to prevent the shielding sleeve from moving along a direction opposite to the insertion direction.

16. The quick connector according to claim 2, wherein the shielding sleeve comprises a sleeve body and a cantilever extending from the sleeve body.

17. The quick connector according to claim 16, wherein the cantilever comprises a stop projection at a free end thereof, and the stop projection extends towards an inside of the shielding sleeve; and wherein the locking leg is configured to stop the stop projection when the locking leg is in the unlocking position to prevent the shielding sleeve from moving along the insertion direction, and to release stopping action on the stop projection during the movement of the locking leg from the unlocking position toward the locking position to allow the shielding sleeve to move toward the indication position along the insertion direction.

18. The quick connector according to claim 1, wherein the shielding sleeve comprises at least one of the following:
 a stop section located on a movement path of the locking leg towards the unlocking position when the locking leg is in the locking position; and
 a shielding section configured to completely shield the indication part when the shielding sleeve is in the initial position and to completely expose the indication part when the shielding sleeve is in the indication position.

19. The quick connector according to claim 2, wherein the shielding sleeve comprises a plurality of guide claws, wherein the plurality of guide claws are spaced apart along a peripheral direction of the shielding sleeve, and are configured to slidingly fit with an outer periphery of the connector body to guide the shielding sleeve to move along the insertion direction.

20. The quick connector according to claim 1, wherein the indication part comprises a machine-identifiable code.

* * * * *